Feb. 27, 1968     P. VAN ZANTEN     3,370,366
THREE DIMENSIONAL MARINE PICTURE
Filed Aug. 6, 1964     2 Sheets-Sheet 1
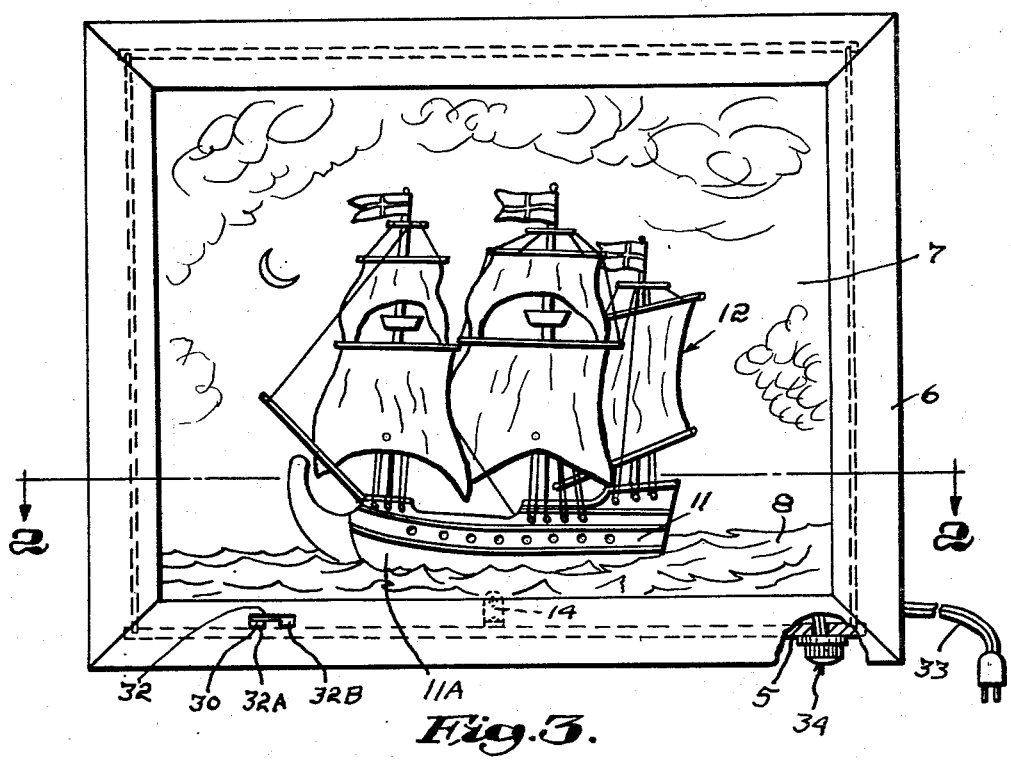
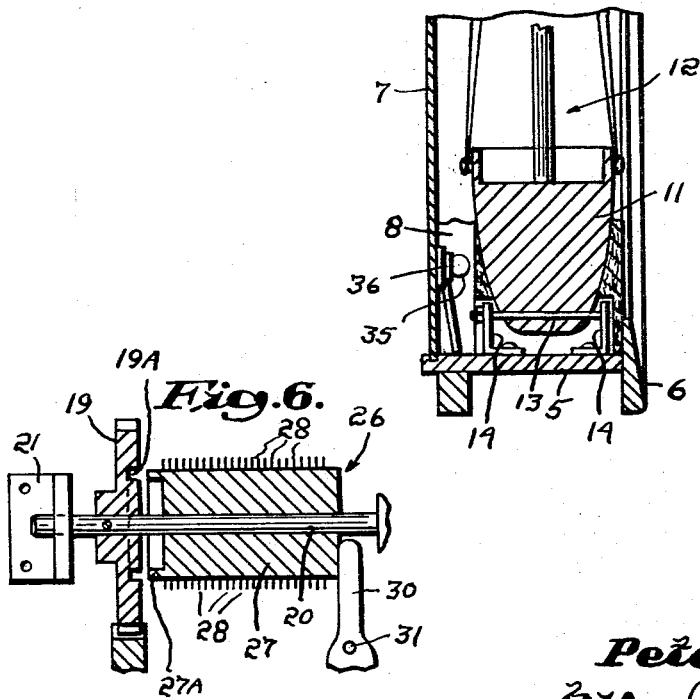
Inventor:
Peter van Zanten,
by Abbott Spear,
Attorney Feb. 27, 1968 P. VAN ZANTEN 3,370,366
THREE DIMENSIONAL MARINE PICTURE
Filed Aug. 6, 1964 2 Sheets-Sheet 2
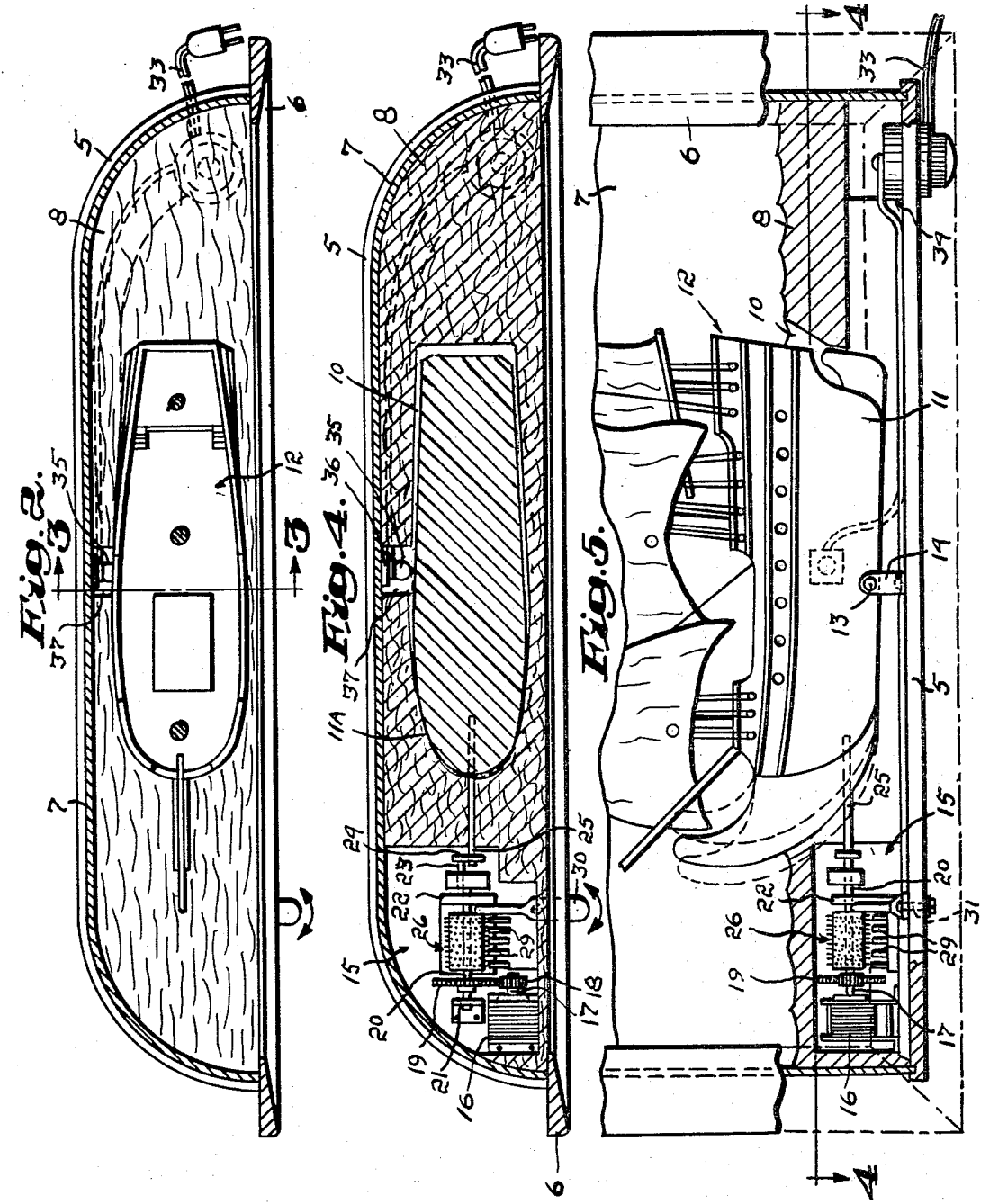
Inventor:
Peter van Zanten,
by Abbott Spear,
Attorney United States Patent Office 3,370,366
Patented Feb. 27, 1968

3,370,366
THREE DIMENSIONAL MARINE PICTURE
Peter Van Zanten, Farmington, Maine 04938
Filed Aug. 6, 1964, Ser. No. 387,947
5 Claims. (Cl. 40—28.1)

The present invention relates to three dimensional marine pictures.

There is an increasing demand for three dimensional displays for wall decoration, both with and without illumination. As marine scenes are always popular, the present invention has, for its general objective, the provision of three dimensional marine pictures featuring a model ship.

In accordance with that objective, a three dimensional marine picture has a base on which there is a layer whose surface simulates water and which has an opening within which the hull of a model ship is fitted. The hull is pivotably supported by the base and power operated means are provided to so pivot the ship as to affect a pitching motion thereof relative to the surface of the layer.

A particular objective of the invention is to provide means for producing sounds, incidental to the pitching motion of the vessel, the sounds suggesting the creaking characteristics of a sailboat as it pitches and rolls.

Another particular objective of the invention is to provide the picture with means for producing music concealed by the layer whose surface simulates water and driven by the means causing the pitching motion of the ship.

Yet another objective of the invention is to provide controls whereby the pitching motion of the model ship may be independent of or accompanied by the music and with means to illuminate the picture with or without the pitching of the model ship.

In the accompanying drawings, there is shown an illustrative embodiment of the invention from which these and other of its objectives, novel features and advantages will be readily apparent.

In the drawings:

FIGURE 1 is a front elevational view of a display,

FIGURE 2 is a section, on an increased scale, taken approximately along the indicated lines 2—2 of FIGURE 1, FIGURE 3 is a fragmentary, vertical cross section taken through the pivotable connection between the hull of the ship and the base, FIGURE 4 is a section taken approximately along the indicated lines 4—4 of FIGURE 5, FIGURE 5 is a fragmentary and partly sectioned front elevation of the display, and FIGURE 6 is a fragmentary and partly sectioned view of the means by which the rotor of the music reproducing means is connected to a gear of the means operative to cause the ship to pitch.

In the embodiment of the invention illustrated by the drawings, a base 5 is secured to a frame 6. A back 7 is secured to the frame 6 and to the rear edge of the base 5.

Supported by the base 5 is a layer 8, expanded, cellular polystyrene has proved to be satisfactory in use, whose upper surface is indicated as roughened and painted to represent white-capped waves. The layer 8 has an opening 10 dimensioned to receive the hull 11 of a generally indicated ship 12, the Mayflower, for example. The ship 12 is shown as an approximate scale model and its hull 11 is made of wood.

A pivot 13 mounted between supports 14 on the base 5 extends transversely through the hull 11 in the amidship zone. The layer 8 is centrally cut away to provide a chamber 15 for an electric motor 16 having a shaft 17 provided with a gear 18 in mesh with a gear 19 on a shaft 20 rotatable in supports 21 and 22 and provided with a crank 23 connected by a link 24 to a pin 25 screwed into the bow 11A.

By this arrangement, when the motor 16 is running, the ship 12 is pivoted to impart to it a pitching motion relative to the water-simulating surface of the layer 8. At the same time its bow 11A engages the margins of the opening 10 causing sounds closely resembling the creaking sounds of a boat, when under sails, as it pitches and rolls.

The chamber 15 also houses a device for playing a tune. The device is generally indicated at 26 and is of the type having a rotor 27 provided with a plurality of radially projecting pins 28 engageable with the keys 29 of the keyboard in a tune producing order. The rotor 27 is slidable on the shaft 20 and is rotatable independently thereof being movable into a position in which its end flange 27A enters the annular groove 19A in the proximate face of the gear 19 by the shifting lever 30 which has an anti-friction face engageable with the other end thereof. The lever 30 is pivoted as at 31 with an end exposed through a slot 32 in the frame 6 for movement from one retaining pocket 32A into the pocket 32B, the rotor 27 then being connected to the gear 19. When the lever is returned to the pocket 32A, the rotor 27 disengages itself from the gear 19 due to the braking action of the keys 29.

The circuit 33 includes a switch 34, a lamp 35 whose socket 36 is below an opening 37 in the layer 8 and the motor 16 and the switch 34 provides an "off" position, a first position in which only the lamp 35 is in the circuit and a second position in which the motor 16 is also in service.

I claim:

1. In a three dimensional marine picture, a base, a layer on said base whose surface simulates water, said layer having an opening exposing said base, a model sailboat whose hull fits within said opening and includes a transverse pivotable connection with said base, and electrically operated means on said base and concealed by said layer, said means including a connection with said hull operable to so pivot said ship as to affect a pitching motion thereof relative to the surface of said layer, a portion of said boat engaging the margins of said opening during at least a part of said motion, said engagement producing sounds suggesting the creaking of said boat as it pitches and rolls.

2. The picture of claim 1 in which the portion of the boat's hull engaging the layer is the bow.

3. The picture of claim 1 in which the portion of the hull engaging the layer is wood and the layer is expanded cellular polystyrene stock.

4. In a three dimensional marine picture, a base, a layer on said base whose surface simulates water, said layer having an opening exposing said base, a model ship whose hull fits within said opening and includes a transverse pivotable connection with said base, and electrically operated means on said base and concealed by said layer, said means including a connection with said hull operable to so pivot said ship as to affect a pitching motion thereof relative to the surface of said layer, said connection including a shaft and a music playing device supported by said shaft for rotation independently thereof and a clutch connection between said device and said shaft means.

5. The picture of claim 4 in which the music playing device consists of a rotor provided with projecting pins and resilient keys engageable thereby, the shaft slidably supports the rotor for rotation independently thereof, and the shaft has a member engageable by one end of the rotor, and a member is provided for urging the rotor into clutching engagement with the member, the engagement of the pins with the keys serving as a brake for the rotor when the member is released.

References Cited

UNITED STATES PATENTS

| | | | |
|---|---|---|---|
| 1,613,941 | 1/1927 | Churus | 272—17 |
| 2,782,560 | 2/1957 | Pollnitz | 272—17 X |
| 2,835,995 | 5/1958 | Eickemeyer | 240—10 X |
| 2,843,949 | 7/1962 | Donahoo | 40—28.1 |
| 3,026,640 | 3/1962 | Ogdon | 40—28.1 X |
| 3,152,413 | 10/1964 | Wariner | 40—28.1 |

EUGENE R. CAPOZIO, *Primary Examiner.*

W. J. CONTRERAS, *Examiner.*